(12) United States Patent
Krebs et al.

(10) Patent No.: US 6,591,193 B2
(45) Date of Patent: Jul. 8, 2003

(54) METHOD AND APPARATUS FOR ACQUIRING OFFSET CHECKSHOT SURVEY DATA USING TUBE-WAVE CONVERSION (75) Inventors: Jerome R. Krebs, Houston, TX (US); Sen-Tsuen Chen, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 15 days.

(21) Appl. No.: 09/961,592

(22) Filed: Sep. 24, 2001

(65) Prior Publication Data
US 2002/0044498 A1 Apr. 18, 2002

Related U.S. Application Data
(60) Provisional application No. 60/239,758, filed on Oct. 12, 2000.

(51) Int. Cl.[7] .............................................. G06F 19/00
(52) U.S. Cl. ............................................. 702/1; 702/18
(58) Field of Search ............................ 702/18, 1, 5, 6

(56) References Cited
U.S. PATENT DOCUMENTS

| | | | | |
|---|---|---|---|---|
| 4,779,236 A | * | 10/1988 | Sondergeld | 367/31 |
| 4,894,809 A | * | 1/1990 | Moeckel | 367/57 |
| 4,993,001 A | | 2/1991 | Winbow et al. | 367/144 |
| 5,268,537 A | | 12/1993 | Winbow et al. | 181/106 |
| 5,696,735 A | * | 12/1997 | Krebs | 367/50 |
| 6,002,642 A | * | 12/1999 | Krebs | 367/73 |
| 6,035,256 A | * | 3/2000 | Stankovic | 702/14 |

OTHER PUBLICATIONS

"Determination of Transversely Isotropic Velocity Parameters at the Pluto Discovery, Gulf of Mexico", Bartel et al., 1998 SEG Expanded Abstacts.*

* cited by examiner

Primary Examiner—John Barlow
Assistant Examiner—Toan M Le
(74) Attorney, Agent, or Firm—Gary P. Katz (57) ABSTRACT A method and apparatus for reliable and low-cost acquisition of offset checkshot survey data using tube wave conversion. An acoustic receiver is deployed in a fluid-filled well, preferably at or near the top thereof. At least one tube-wave conversion point is used, such as an interface between two immiscible fluids, a change in casing geometry or a wellbore constriction. The traveltime of a tube wave from the tube-wave conversion point to the acoustic receiver is determined. Then, a seismic signal is generated at a laterally offset location. The total seismic signal traveltime along a raypath from the source location to the tube-wave conversion point and then upwardly through the fluid-filled well to the acoustic receiver is measured. The previously determined tube-wave traveltime from the conversion point to the acoustic receiver is then subtracted from the total traveltime to obtain the seismic signal traveltime from the source location to the tube-wave conversion point.

25 Claims, 10 Drawing Sheets

METHOD AND APPARATUS FOR ACQUIRING OFFSET CHECKSHOT SURVEY DATA USING TUBE-WAVE CONVERSION

This application claims the benefit of U.S. Provisional Application No. 60/239,758 filed on Oct. 12, 2000.

FIELD OF THE INVENTION

This invention relates generally to the field of seismic prospecting and, more particularly, to migration of seismic data. Specifically, the invention is a method and apparatus for using tube-wave conversion to acquire offset checkshot survey data for the subsurface region in the vicinity of a well. Accurate migration traveltimes for the subsurface region may be derived from the offset checkshot survey data.

BACKGROUND OF THE INVENTION

In the oil and gas industry, seismic prospecting techniques are commonly used to aid in the search for and evaluation of subterranean hydrocarbon deposits. A seismic prospecting operation consists of three separate stages: data acquisition, data processing, and data interpretation. The success of a seismic prospecting operation is dependent on satisfactory completion of all three stages.

In the data acquisition stage, a seismic source is used to generate a physical impulse known as a "seismic signal" that propagates into the earth and is at least partially reflected by subsurface seismic reflectors (i.e., interfaces between underground formations having different elastic properties). The reflected signals (known as "seismic reflections") are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface geologic structure from the recorded seismic data for use during the data interpretation stage. The image is developed using theoretical and empirical models of the manner in which the seismic signals are transmitted into the earth, attenuated by the subsurface strata, and reflected from the geologic structures. The quality of the final product of the data processing stage is heavily dependent on the accuracy of the procedures used to process the data.

The purpose of the data interpretation stage is to determine information about the subsurface geology of the earth from the processed seismic data. For example, data interpretation may be used to determine the general geologic structure of a subsurface region, or to locate potential hydrocarbon reservoirs, or to guide the development of an already discovered reservoir. Obviously, the data interpretation stage cannot be successful unless the processed seismic data provide an accurate representation of the subsurface geology.

Typically, some form of seismic migration (also known as "seismic imaging") must be performed during the data processing stage in order to accurately position the subsurface seismic reflectors. The need for seismic migration arises because variable seismic velocities and dipping reflectors cause seismic reflections in unmigrated seismic images to appear at incorrect locations. Seismic migration is an inversion operation in which the seismic reflections are moved or "migrated" to their true subsurface positions.

There are many different seismic migration techniques. Some of these techniques are applied after common-midpoint (CMP) stacking of the seismic data traces. Such "poststack" migration can be done, for example, by integration along diffraction curves (known as "Kirchhoff" migration), by numerical finite difference or phase-shift downward-continuation of the wavefield, or by equivalent operations in frequency-wavenumber or other data domains.

Other seismic migration techniques are applied before stacking of the seismic data traces. In other words, these "prestack" migration techniques are applied to the individual nonzero-offset data traces and the resulting migrated data traces are then stacked to form the final image. Prestack migration typically produces better images than poststack migration. However, prestack migration is generally much more expensive than poststack migration. Accordingly, the use of prestack migration has typically been limited to situations where poststack migration does not provide an acceptable result, e.g., where the reflectors are steeply dipping.

Regardless of the type of migration being used, an accurate migration velocity model and/or accurate migration traveltimes are required. Incorrect migration velocities and/or traveltimes can lead to at least two undesirable consequences. First, the resulting image may be poorly focused, making data interpretation difficult. Second, the reflectors may be mispositioned, a serious drawback in hydrocarbon exploration where accurate mapping of the subsurface structure is highly important. The effects of poor focusing and improper positioning are particularly apparent when migrating steeply dipping reflectors or when migrating in areas having significant lateral velocity variations.

Conventional methods for generating migration velocity models and/or migration traveltimes typically analyze seismic raypaths, which are inclined less than about 45 degrees with respect to the vertical. Unfortunately, accurate migration of steeply dipping reflectors, such as salt flanks and faults, also requires accurate migration traveltimes for raypaths that are closer to horizontal. Accurate traveltimes for horizontal or nearly horizontal raypaths may also be required for imaging subsurface areas having significant lateral velocity variations.

Figure 1:
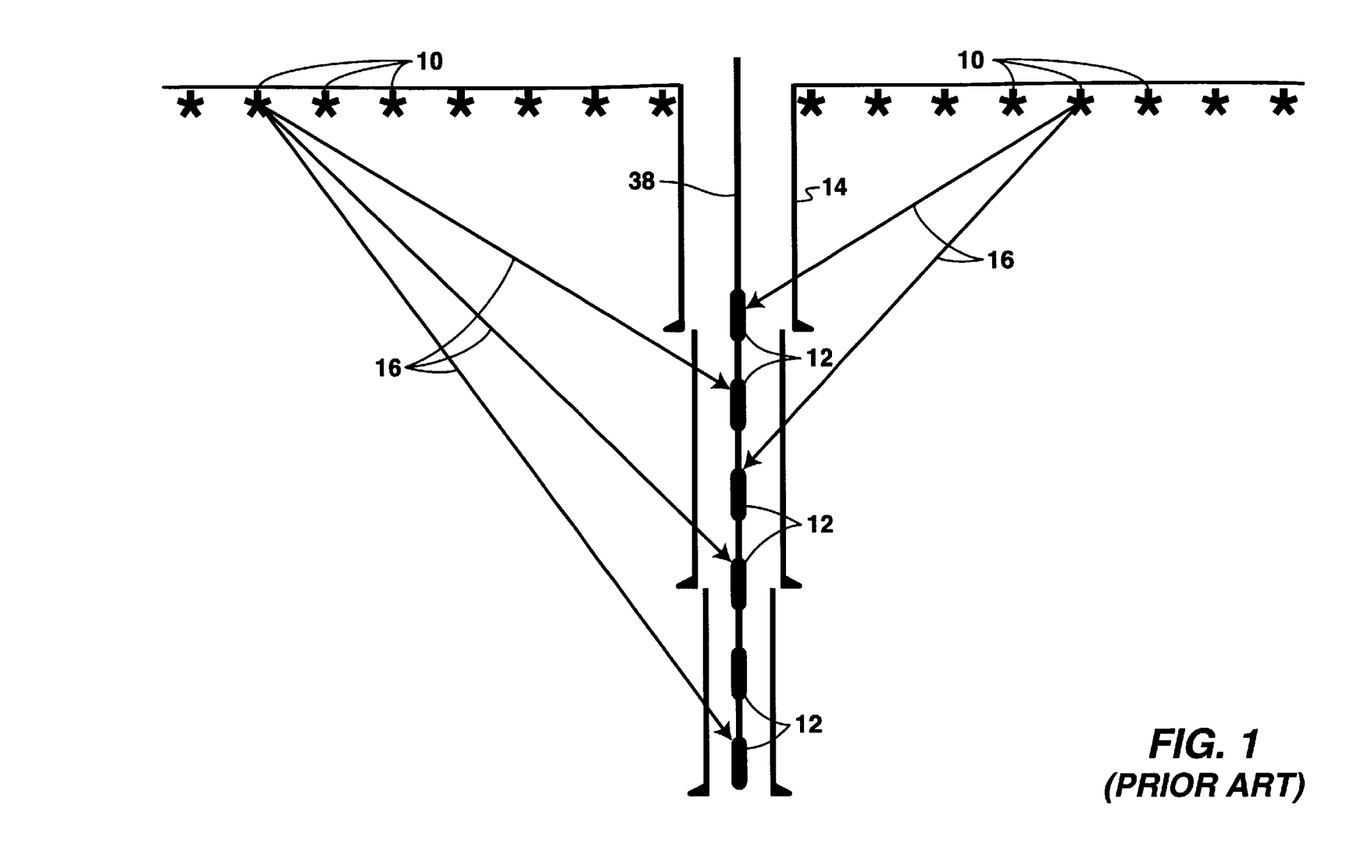
FIG. 1 illustrates the conventional method of gathering offset checkshot survey data for the subsurface region adjacent to a well.

U.S. Pat. Nos. 5,696,735 and 6,002,642, both issued to J. R. Krebs, disclose a method for migrating seismic data using offset checkshot survey measurements. This method is particularly advantageous for imaging steeply dipping reflectors located in the vicinity of a well. According to this method, offset checkshot survey data are gathered from the subsurface region adjacent to the subsurface feature to be imaged. As illustrated in FIG. 1, these data typically are gathered using surface sources 10 and borehole receivers 12 located at various depths in the well 14. Typically, the borehole receivers 12 are attached to a standard electric wireline 38. The sources and receivers are placed in a geometry which results in raypaths 16 that are geometrically similar to the raypaths in the seismic data to be used in imaging the subsurface feature in question. The offset checkshot survey measurements are used to determine direct arrival traveltimes from the surface sources 10 to the borehole receivers 12. These traveltimes may be used to generate a reflector-weighted migration velocity model to allow accurate migration of the reflector dips of greatest interest. Alternatively, the traveltimes may be used directly in migration routines that accept traveltime inputs. The method disclosed by Krebs may be used in time, depth, or Kirchhoff migration, in either two or three dimensions, and in either prestack or poststack applications.

Unfortunately, current methods of collecting offset checkshot survey data are very expensive and require substantial rig time. Typically, many tens of downhole receiver stations and surface shotlines are needed in order to acquire sufficient offset checkshot survey traveltime measurements for accurate migration of the subsurface area surrounding a well. For example, a complete three-dimensional offset checkshot survey of the subsurface area surrounding a well typically requires a grid of 30 or more surface shotlines and 30 or more downhole receiver stations. Such a survey may require as much as 900 hours of rig time, or even more, to complete using current methods of data acquisition. For this reason, the offset checkshot survey technique has not been used as widely as it should be, and when it has been used, it has typically been limited to acquiring incomplete data from only a few surface shotlines and downhole receiver stations, thus compromising the accuracy of the subsequent seismic migration.

Offset checkshot survey data typically are collected using conventional three-component downhole geophone tools. These tools typically contain only a few receivers spaced at intervals of up to about 15 meters and can gather data for only a very narrow range of depths (e.g., less than about 100 meters) for each surface shot. Preferred receiver spacings for offset checkshot survey measurements are on the order of 150 meters. Thus, to gather offset checkshot survey data for a large portion of a well (e.g., 5,000 meters), the geophone tool must be repositioned in the wellbore up to 30 times or more.

One potential solution to this problem would be to develop a modified version of conventional downhole geophone tools having ultra-long receiver spacings (e.g., up to about 150 meters between receivers) and containing several (e.g., up to 30 or more) individual receivers. Such a tool could potentially cover all or a significant portion of the depth interval of a well needed for a complete offset checkshot survey and, therefore, the need for repositioning of the tool would be eliminated or substantially reduced. Such a tool would greatly reduce the time and cost of acquiring offset checkshot survey data. However, the assembling and operation of such an ultra-long tool on the rig floor would be cumbersome at best, and its reliability would be an issue in practical field operations.

Another potential solution would be to permanently install geophones at the desired locations throughout the well. This alternative, however, would be very expensive, and reliability of the geophones throughout the life of the well would be uncertain.

Accordingly, it can be seen that there is a need for a reliable, low-cost method and apparatus for acquiring offset checkshot survey data for the subsurface region surrounding a well. Preferably, such a method and apparatus should eliminate the frequent repositioning of downhole receivers required for a conventional offset checkshot survey, and should reduce the time and cost required to acquire complete offset checkshot survey data. The present invention satisfies this need.

SUMMARY OF THE INVENTION

In one embodiment, the present invention is a method for acquiring offset checkshot survey data for the subsurface region in the vicinity of a fluid-filled well comprising the steps of (a) deploying an acoustic receiver at a known depth in the well; (b) determining the tube wave traveltime from the acoustic receiver to a tube wave conversion point located in the well; (c) generating a seismic signal at a source location that is laterally offset from the well; (d) measuring the total seismic signal traveltime along a raypath from the seismic source location to the tube wave conversion point and then to the acoustic receiver; and (e) subtracting the tube wave traveltime from the total seismic signal traveltime to determine the seismic signal traveltime from the seismic source location to the tube wave conversion point. Preferably, the acoustic receiver is located at or near the top of the well.

The acoustic receiver is preferably a plurality of hydrophones arranged in a short linear array. In this way, the tube wave velocity may be measured, from the tube-wave moveouts along the receiver array, as the tube-wave passes along the receiver array.

The depth of the tube wave conversion point may be determined by generating a tube wave above the acoustic receiver and measuring the two-way tube-wave traveltime from the acoustic receiver downwardly to the tube-wave conversion point and then upwardly to the acoustic receiver. This traveltime may then be divided by the tube-wave velocity to obtain the depth of the tube-wave conversion point.

If the locations of naturally occurring tube-wave conversions are not adequate a tube-wave conversion point may be created at any desired depth. The tube-wave conversion point may be created by attaching a constriction to the well tubulars at that depth, by hanging a constriction inside the wellbore at that depth, or by positioning the interface between two immiscible fluids at that depth.

In one embodiment, the apparatus of the invention comprises (a) a seismic source for generating body waves in the subsurface region; (b) at least one tube-wave conversion point located in the well for converting body waves to tube waves; (c) at least one acoustic receiver located in the well for receiving converted tube waves; (d) means for measuring the tube-wave traveltime from the tube-wave conversion point to the acoustic receiver; and (e) means for measuring the total traveltime of a seismic signal from the seismic source to the tube-wave conversion point and then through the fluid-filled well to the acoustic receiver.

In a preferred embodiment, tube-wave conversion points are created at the desired depths within the wellbore by attaching constrictions to a cable. The cable is then positioned in the well below the acoustic receiver so that the constrictions are located at the desired depths.

BRIEF DESCRIPTION OF THE DRAWINGS

The present invention and its advantages will be better understood by referring to the following detailed description and the attached drawings in which.

DETAILED DESCRIPTION OF THE PREFERRED EMBODIMENTS

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

Seismic energy may be transmitted through an elastic solid by "body waves," which may be either compressional waves (P-waves) or shear waves (S-waves). Seismic energy may also be transmitted along boundaries between substances having different elastic properties by "surface waves." A surface wave that travels longitudinally in a fluid-filled borehole is known as a "tube wave."

When a tube wave traveling in a fluid-filled borehole encounters the bottom of the borehole or some other discontinuity or irregularity in the borehole, a body wave is generated that radiates into the surrounding earth formations. This phenomenon (known as "tube-wave conversion") was utilized in U.S. Pat. No. 4,993,001 (issued Feb. 12, 1991 to Winbow et al.) to develop a unique downhole seismic source in which tube waves are generated at or near the surface of the earth and injected into a fluid-filled borehole. The tube waves are guided downwardly by the borehole until they encounter an elongated tube-wave converter positioned at the desired downhole source location. When the tube waves strike the converter, they are converted into body waves which radiate outwardly from the converter into the surrounding earth formations.

The tube-wave conversion phenomenon also occurs in the reverse direction. In other words, when a body wave traveling in a subsurface earth formation encounters a fluid-filled borehole, the body wave is converted into tube waves at discontinuities in the well geometry (e.g., the bottom of the borehole, a change in casing diameter or a constriction in a borehole) or lithologic boundaries with high impedance contrasts in the surrounding subsurface formations. These converted tube waves travel in the borehole both upwardly and downwardly from the conversion point and may be detected by geophones, hydrophones, or other sensors at remote locations in the borehole.

The present invention is a method and apparatus for acquiring offset checkshot survey data for the subsurface region surrounding a wellbore using the tube-wave conversion phenomenon. As described above, the desired offset checkshot survey data comprise seismic signal direct arrival traveltimes from laterally offset seismic signal source locations (either on the surface or in one or more adjacent boreholes) to downhole locations at various depths in the well. The invention utilizes the tube-wave conversion phenomenon to avoid the need for positioning seismic detectors at multiple depths in the well.

According to a first embodiment of the invention, a shallow hydrophone array, deployed only near the top of the borehole, replaces the downhole detectors used in conventional offset checkshot survey data collection. The invention takes advantage of the fact that body waves traveling in the subsurface formations are strongly converted to tube waves at discontinuities in the well geometry (e.g., changes in casing diameter), at constrictions in the borehole, at interfaces between two different borehole fluids, and at lithological boundaries with high impedance contrasts in the formations surrounding the borehole. These converted tube waves travel longitudinally along the borehole and are detected and recorded by the shallow hydrophone array. Since the total measured traveltime from the source location to the hydrophone array is simply the sum of the body-wave traveltime from the source location to the conversion point and the tube-wave traveltime from the conversion point to the hydrophone array, the desired seismic signal direct arrival traveltime can be easily determined by simply subtracting the tube-wave traveltime from the total measured traveltime. Since the velocity of tube waves can easily be measured, their traveltime can be determined simply by dividing the depth from the hydrophone array to the conversion point by the tube-wave velocity.

Figure 2:
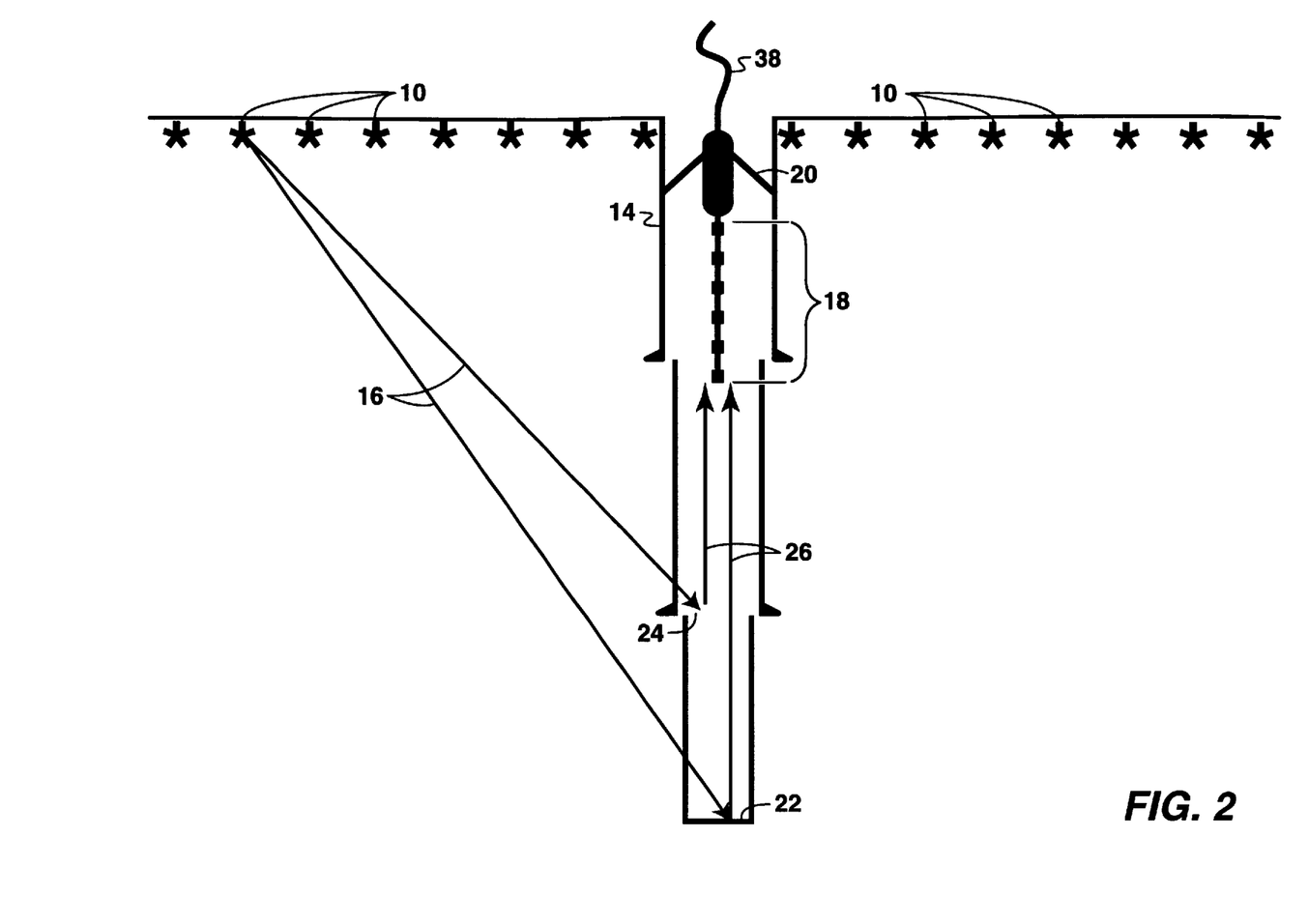
FIG. 2 illustrates a first embodiment of the present invention for gathering offset checkshot survey data using the tube-wave conversion phenomenon.

A first embodiment of the present invention is illustrated in FIG. 2. The invention uses surface sources 10 in the same manner as convention offset checkshot survey data collection. Alternatively, the sources may be downhole sources located in one or more adjacent wells. Well 14 contains a shallow hydrophone array 18, held in place by a locking device 20, in lieu of the conventional borehole detector(s). Locking device 20 permits wireline 38 to be slackened to reduce transmission of extraneous rig noise to the hydrophone array 18. Body waves traveling along raypaths 16 encounter casing discontinuities, such as hole bottom 22 or diameter change 24, where they are converted to tube waves 26 which travel upwardly in well 14 and are detected by hydrophone array 18. The desired direct arrival traveltimes are determined by subtracting the tube-wave traveltime from the total measured traveltime.

The preferred downhole receiver for detection of converted tube waves is a hydrophone array because hydrophones are very sensitive to tube waves. In principle, the present invention requires only a single hydrophone. However, a hydrophone array consisting of a plurality of hydrophones (e.g., six) having short spacings (e.g., three meters) between receivers may be used to improve reliability, provide valuable redundancy, discriminate against waves that are not upgoing tube waves, and provide a means to accurately measure the tube wave velocity.

Figure 3:
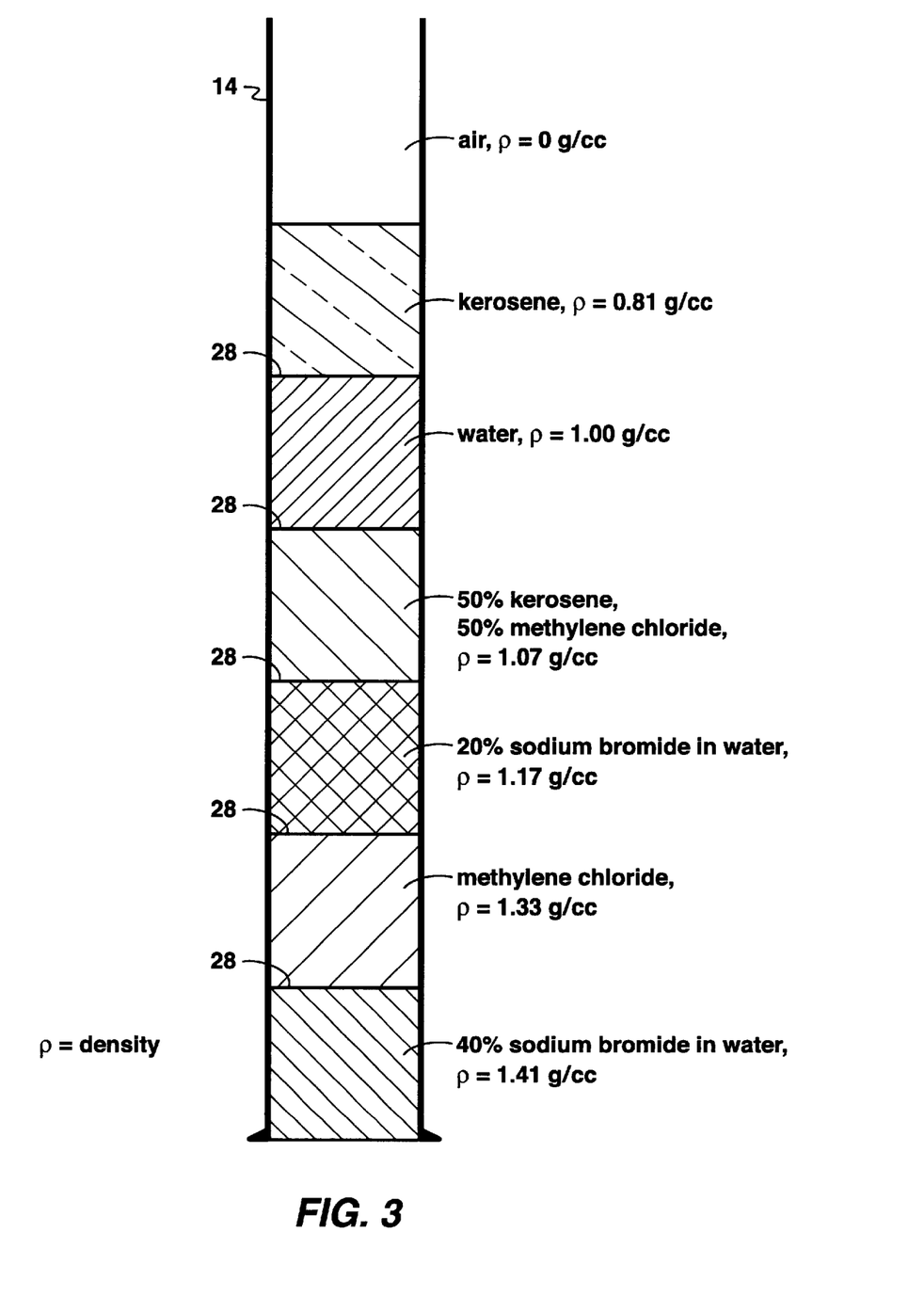
FIG. 3 illustrates the use of a series of immiscible fluids to create additional downhole tube-wave conversion points.

It is possible that the borehole will contain insufficient discontinuities to generate the desired offset checkshot survey data. In this case, additional tube-wave conversion points may be created by attaching constrictions to the casing tubulars at the desired depth points. These constrictions can be extra casing collars, rubber packers, or any other type of object that would create a significant change in casing geometry. Alternatively, tube-wave conversion points may also be created by attaching constrictions to a cable and positioning the cable in the borehole such that the constrictions are located at the desired depths. Another possibility would be to fill the wellbore with a series of immiscible fluids to create a number of fluid interfaces, as illustrated in FIG. 3. The fluid having the highest density (e.g., 40% sodium bromide in water in FIG. 3) would be located at the bottom of the well 14; the fluid having the next highest density (e.g., methylene chloride in FIG. 3) would be located immediately above the densest fluid; and so on. Interfaces 28 between the various fluid layers provide a series of well-defined tube-wave conversion points.

Figure 4:
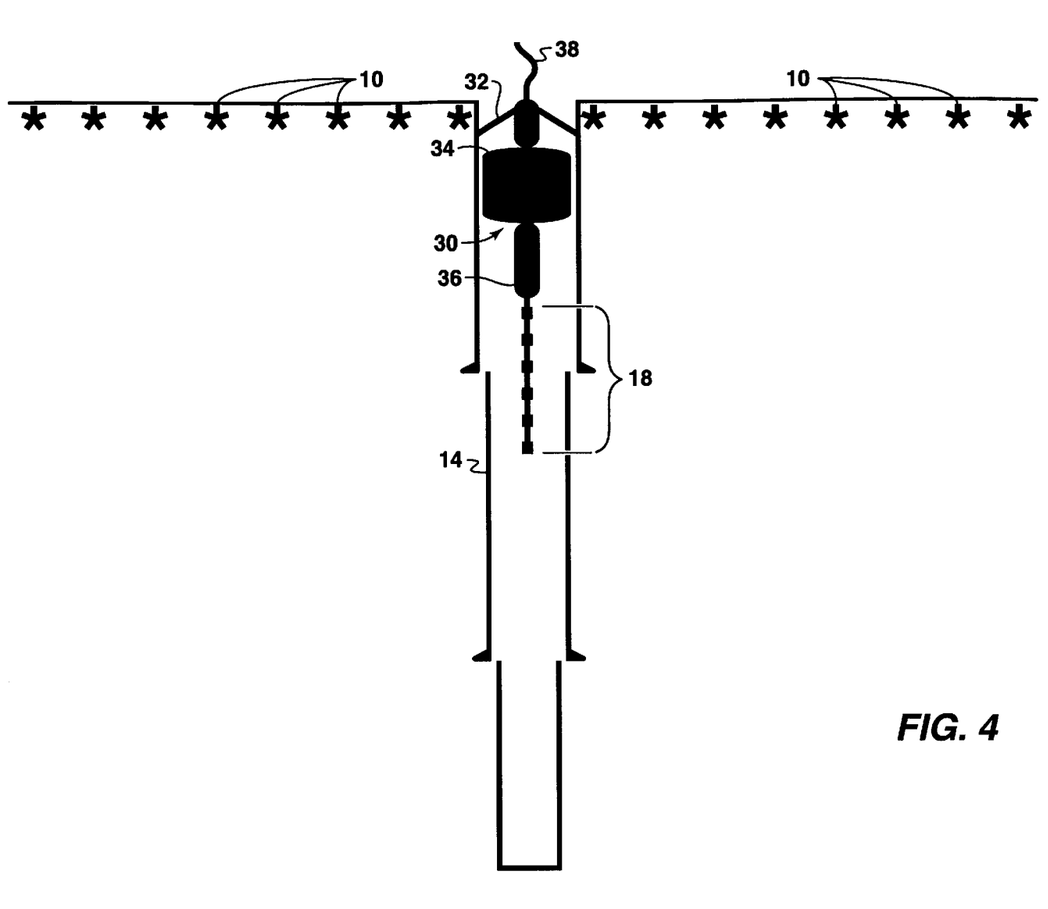
FIG. 4 illustrates one embodiment of a detector tool for use in connection with the present invention.

FIG. 4 illustrates one embodiment of a detector tool 30 for use in a regular open or cased hole. The tool 30 consists of a short hydrophone array 18 (e.g., six hydrophones with approximately three-meter spacing), a mechanical locking arm 32, a tube-wave damper 34, and a low energy tube-wave source 36. The hydrophone array 18 is the main part of the tool 30. It detects the converted tube waves from the identified conversion points for measurement of the traveltimes. A downhole digitizer (not shown), a multi-conductor wireline, or a multi-conductor extension cable can be used to transmit the data uphole for recording.

The mechanical locking arm 32 is used to hold the tool in well 14, allowing wireline 38 to be slackened. The locking arm can be a conventional geophone locking device (e.g., a dummy geophone), an inflatable borehole packer, or any other suitable locking device. The slackened wireline reduces the transmission of surface noises to the hydrophone array. These noises could be initiated from rig movement or other vibration on the rig floor.

The tube-wave damper 34 is used to further dampen downgoing tube-wave noises generated from the surface. This damper can be a number of sections of borehole packers or some type of inflatable air chamber. If a mechanical damper is used, such as an inflatable borehole packer, it can serve as both a tube-wave damper and a locking device.

The tube-wave source 36 is used to generate a simple tube wave for identification of potential tube-wave conversion points in the well 14. The tube wave travels downwardly through the hydrophone array and reflects back from the potential conversion points that could convert body waves to tube waves during the offset checkshot survey. A simple tube-wave source may be a piezoelectric source, a sparker source, an airgun source, or any other impulsive source. A simple tap on the well head or on the ground near the well head can also generate a simple tube wave, which can replace the downhole tube-wave source 36. The surface tap should be made before the downhole tube-wave damper 34 is in place or before it is inflated if an inflatable damper is used.

The move-out time of the direct downgoing and reflected upgoing tube waves along the hydrophone array can be used to calculate the tube-wave velocity, V, according to the following equation:

$$V = (T_n - T_m) \div X \quad (1)$$

where Tn and Tm are the tube-wave traveltimes at the mth and nth hydrophones, respectively, and X is the distance between the mth and nth hydrophones.

The traveltime between the first downgoing tube wave and a specific reflected tube wave represents the two-way traveltime, 2T, for the tube-wave travel from the hydrophone position to the conversion point. The depth, D, from the hydrophone position to the conversion point can thus be computed by multiplying the tube-wave velocity, V, obtained from equation (1) by the one-way traveltime, T:

$$D = V \times T. \quad (2)$$

The desired offset checkshot survey traveltime data, i.e., the traveltime of a body wave from the source location to the conversion point, Tp, may be determined by subtracting the one-way tube-wave traveltime, T, from the total measured seismic signal traveltime, Tt:

$$Tp = Tt - T. \quad (3)$$

If multiple layers of borehole fluids are used to create downhole conversion points (as illustrated in FIG. 3), the above procedure for measurement of tube-wave velocity and determination of the depth of the conversion points should be done by placing the hydrophone array in each layer of fluid because of the different tube-wave velocities of the fluid layers. The total tube-wave traveltime would be the sum of the traveltimes in each layer of fluid. The fluid interfaces should be strategically placed relative to other tube-wave conversion points (e.g., casing geometry changes or restrictions) to yield a favorable distribution of total conversion points.

Figure 5:
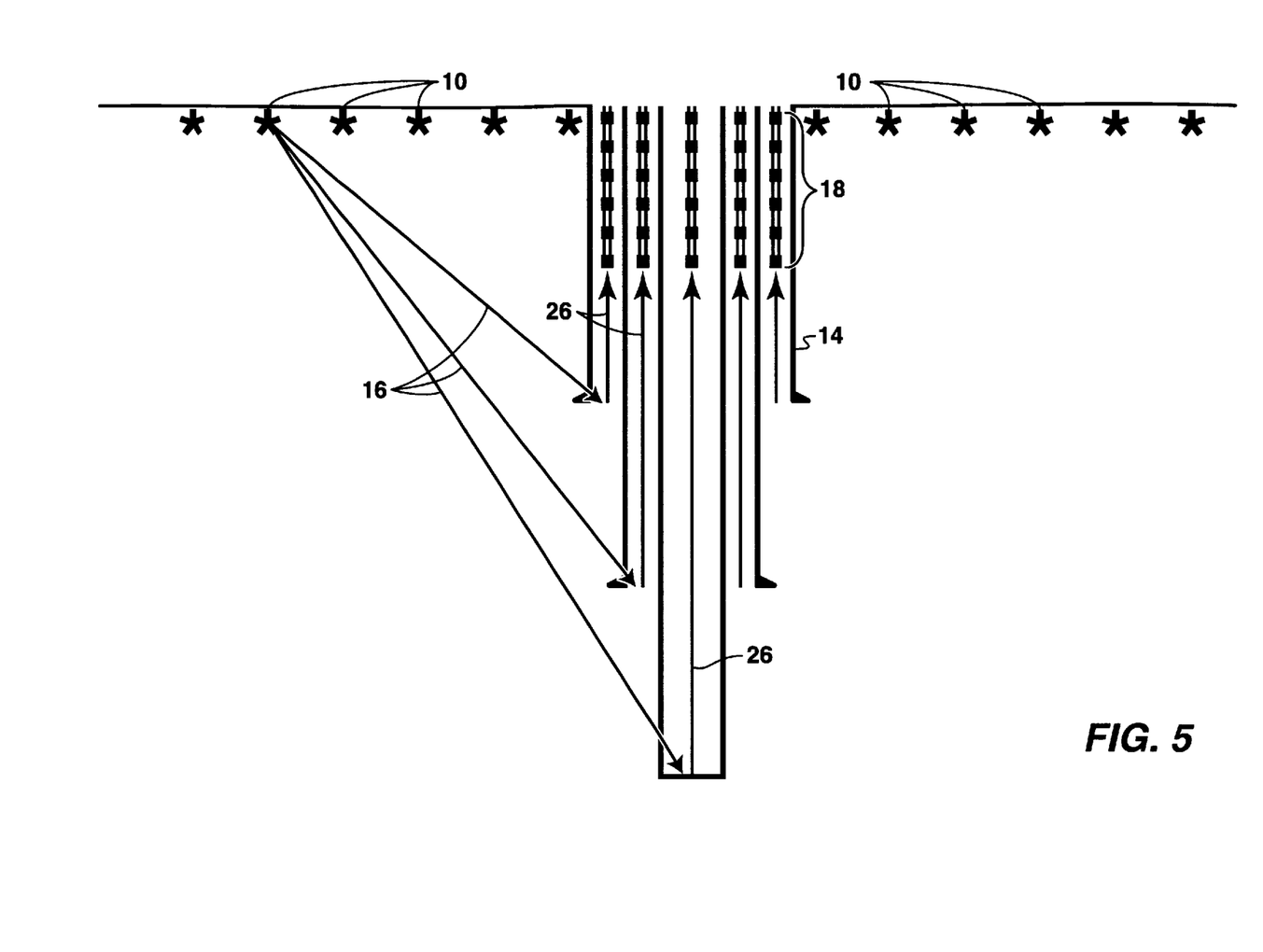
FIG. 5 illustrates an embodiment of the present invention in which one or more hydrophone arrays are located in the casing annulus in a well having multiple casing strings.

FIG. 5 illustrates an embodiment of the invention in which one or more hydrophone arrays 18 are located in the casing annulus in a well having multiple casing strings. The hydrophone array(s) 18 could be protected with coil tubing or other protective sleeves before being placed into the annulus, and can be kept in place permanently. Tube-wave dampers similar to those shown in FIG. 4 could be used if desired to reduce extraneous noise. The hydrophone array(s) 18 may be permanently mounted in the casing annulus or some type of releasable locking device may be used.

In drilling a new well, the hydrophone array(s) 18 could be deployed in the annulus between the surface casing and the drill casing. The offset checkshot survey data acquisition would not interfere with normal drilling or logging operations. This would eliminate the need for devoting rig time to acquire the offset checkshot survey data.

In a production well, the hydrophone array(s) 18 could be deployed in the annulus between production tubing and casing. Thus, there is no need to remove the production tubing from the well in order to acquire the offset checkshot survey data, and acquisition of the data would not interfere with normal production in the well. Permanent installation of one or more hydrophone arrays in the casing annulus also provides opportunities for further offset checkshot surveys that may include an opportunity for large-scale recording of offset checkshot survey data during a surface 3-D seismic survey.

Figure 6:
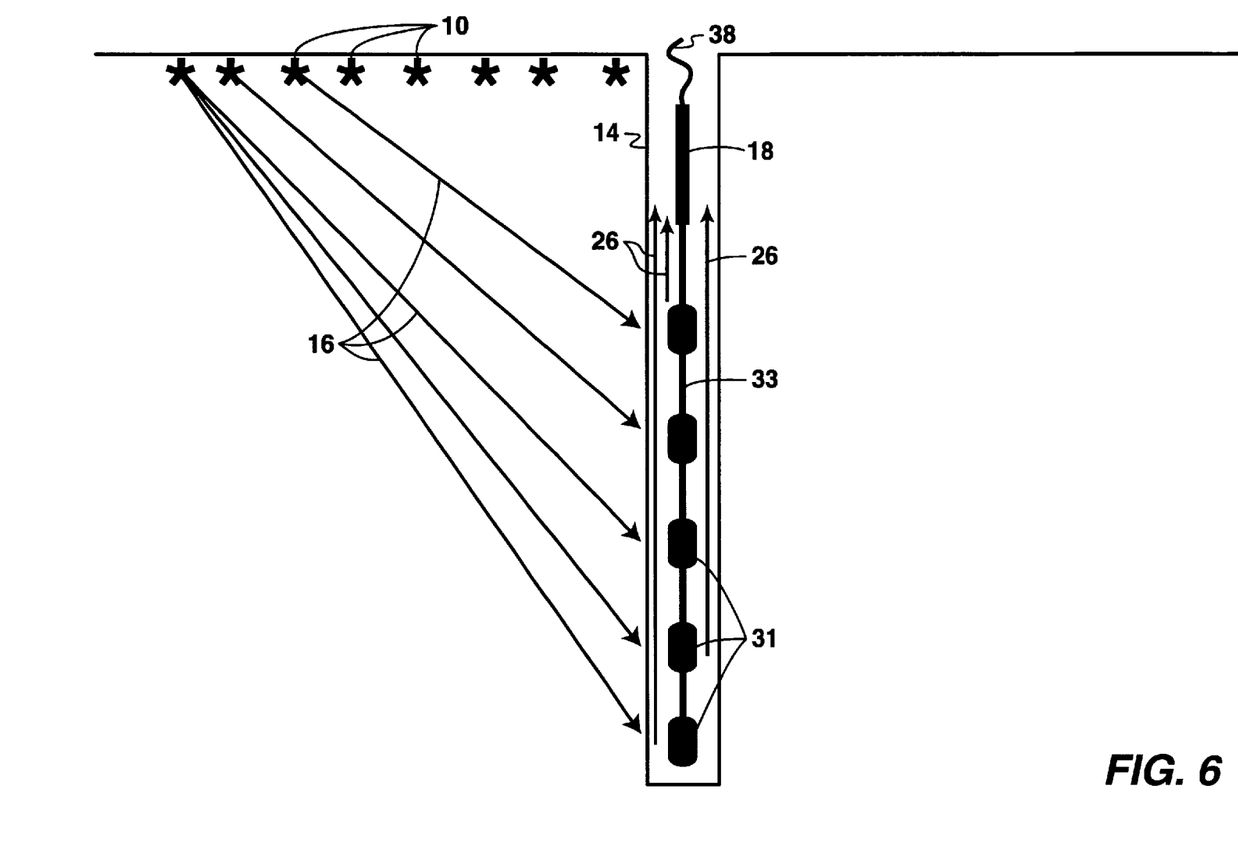
FIG. 6 illustrates an embodiment of the present invention in which borehole constrictions attached to a cable are used to create additional downhole tube-wave conversion points.

Another embodiment of the invention is illustrated in FIG. 6. In this embodiment additional tube-wave conversion points are created by attaching constrictions 31 to a cable 33 and inserting the cable into well 14. Preferably, the cable 33 is suspended from the lower end of hydrophone array 18. Constrictions 31 can easily be attached (clamped) to the cable at pre-determined points (e.g., every 150 meters) while the cable is lowered into the well.

One example of a constriction 31 is a two-halved cylindrical rod (i.e., 3 foot long and 3½ inches in diameter) cut and machined to fit onto the cable. For purposes of easy operation, the material of the constriction can be either a type of light metal or other material that is slightly heavier than the borehole fluid.

EXAMPLES

Figure 7:
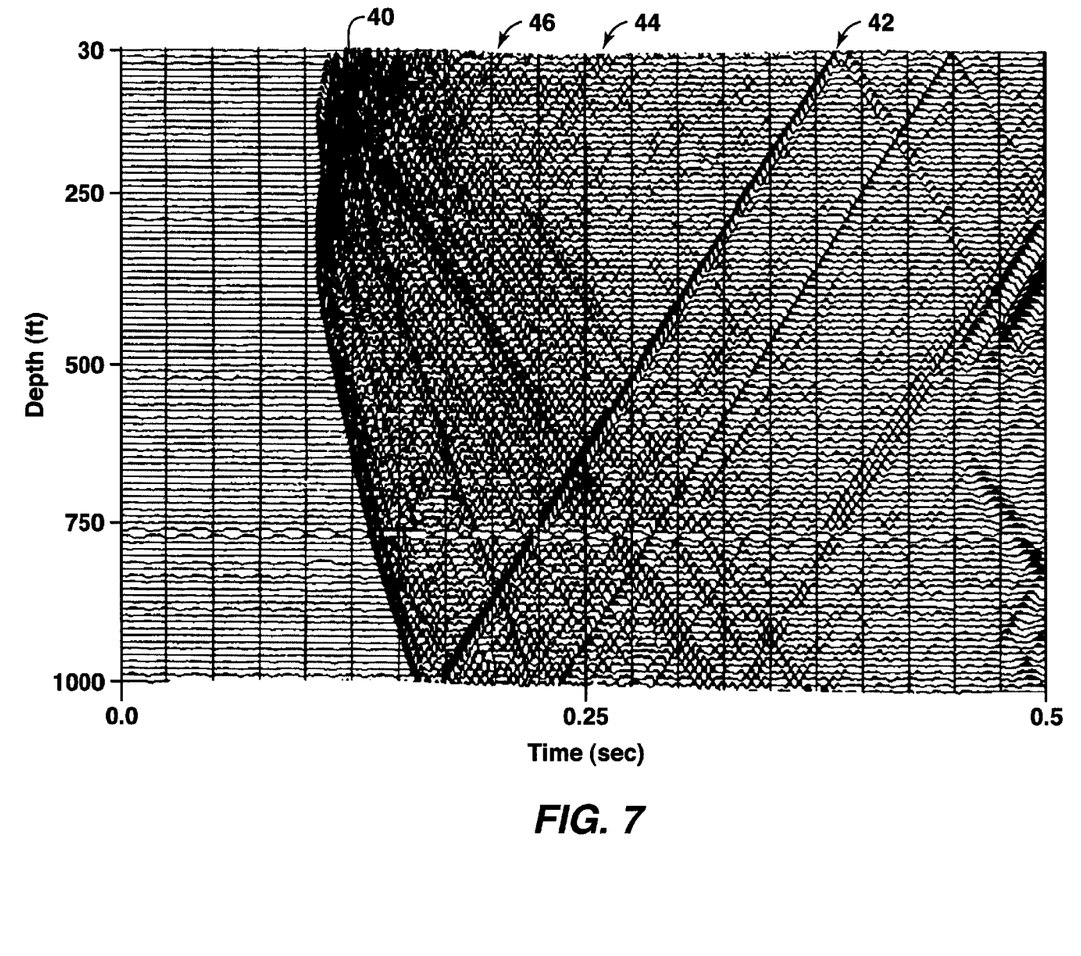
FIG. 7 shows seismic data gathered in a well using a long array of hydrophone receivers with the seismic source located at a fixed depth in an adjacent well.

An example of a seismic data gather from a well is shown in FIG. 7. This common-source gather represents the waves recorded with a long array of hydrophone receivers throughout the entire depths of the well with the source shooting from a fixed depth in a nearby well. The direct body (P) waves 40 and a strong converted tube wave 42 from the bottom of the well are indicated. Many other upgoing converted tube waves (e.g., 44 and 46) are also seen, although not as strong. There is no change of casing geometry in this well that could have generated these converted tube waves; therefore, lithological boundaries in the surrounding formations must be responsible for generating these converted tube waves. This example differs from a conventional offset checkshot survey in that a higher-frequency source is deployed in an adjacent well, rather than a much lower-frequency source at the surface. However, this difference does not affect the conclusion that there is a strong conversion of body waves into tube waves.

Figure 8A:
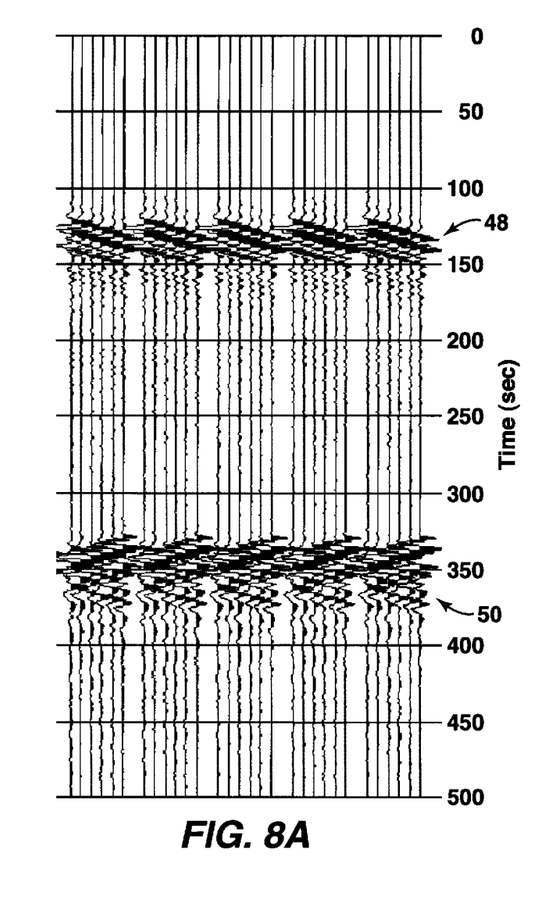
FIGS. 8(a) and 8(b) show two groups of seismic data gathers recorded using a six-level hydrophone array to detect both downgoing and upgoing tube waves.
Figure 8B:
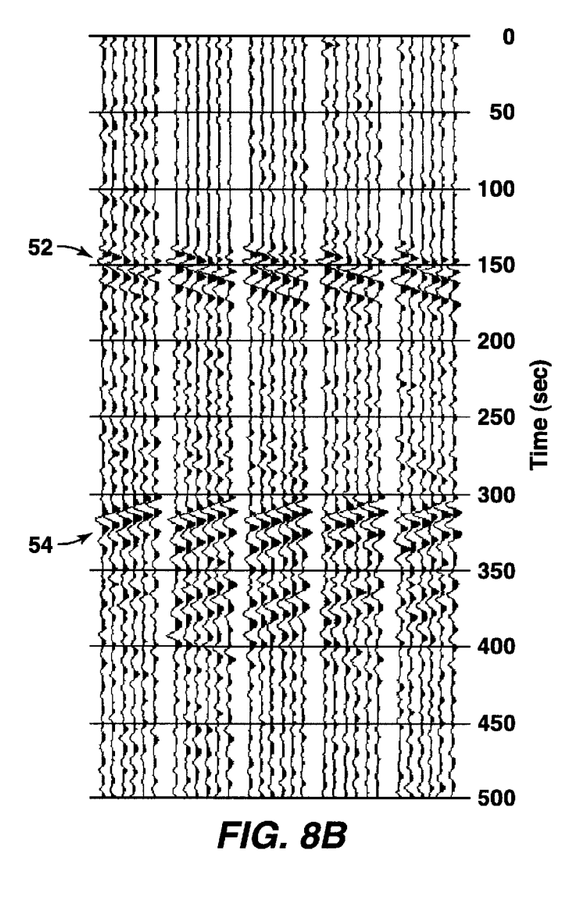

FIGS. 8(a) and 8(b) illustrate two groups of seismic data gathers recorded with a six-level hydrophone array in a similar arrangement to that shown in FIG. 4, except that no tube-wave damper or tube-wave source were used. A locking arm (a dummy geophone module) was used to hold the hydrophone array in the well, and the wireline was slackened to isolate surface noises from the downhole hydrophones.

In FIG. 8(a), the gathers are the recorded tube waves generated by tapping the concrete well pad, repeated five times. The direct downgoing tube waves 48 and the reflected tube waves 50 from the bottom of the well are indicated. As described earlier, the tube-wave move-out along the hydrophone array and the time intervals between the downgoing tube waves and reflected tube waves allow the tube wave velocity, the depths of the conversion points, and the tube-wave traveltimes from the conversion points to the hydrophone array to be computed.

In FIG. 8(b), the gathers are data recorded with the same six-level hydrophone array at the same location with a surface seismic source shooting from 500 feet away, repeated for five shots. The direct body (P) waves 52 and the strong converted tube waves 54 from the bottom of the well are indicated. The converted tube waves from the bottom of the well are consistent with reflected tube waves observed in FIG. 8(a). The traveltime of the body wave from the source location to the conversion point can then easily be computed, as described above.

Figure 9:
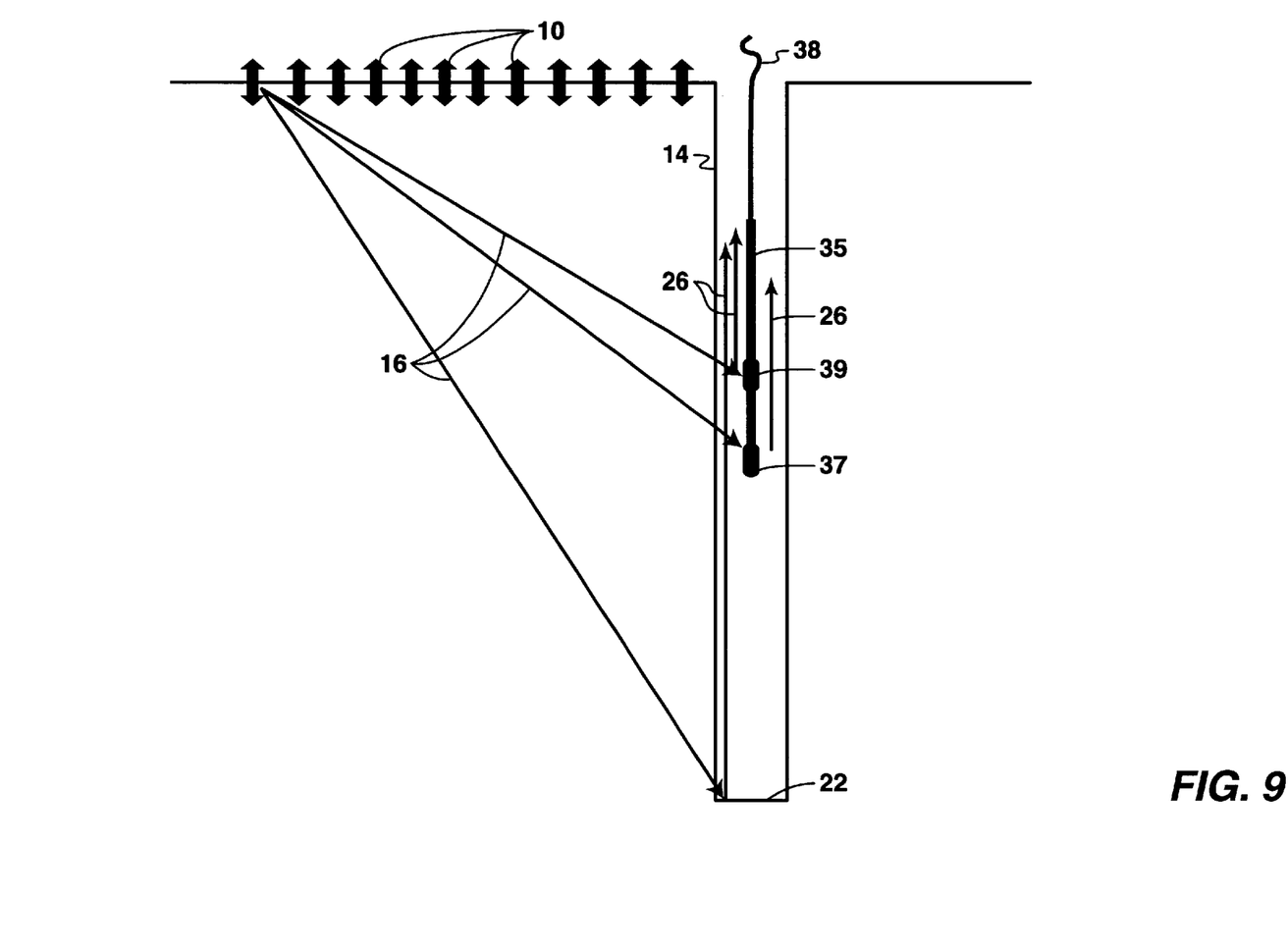
FIG. 9 schematically illustrates a field test of the present invention which utilized a 36-channel hydrophone streamer as the acoustic receiver and a sink weight, a digitizer, and the bottom of hole as downhole tube-wave conversion points.
Figure 10A:
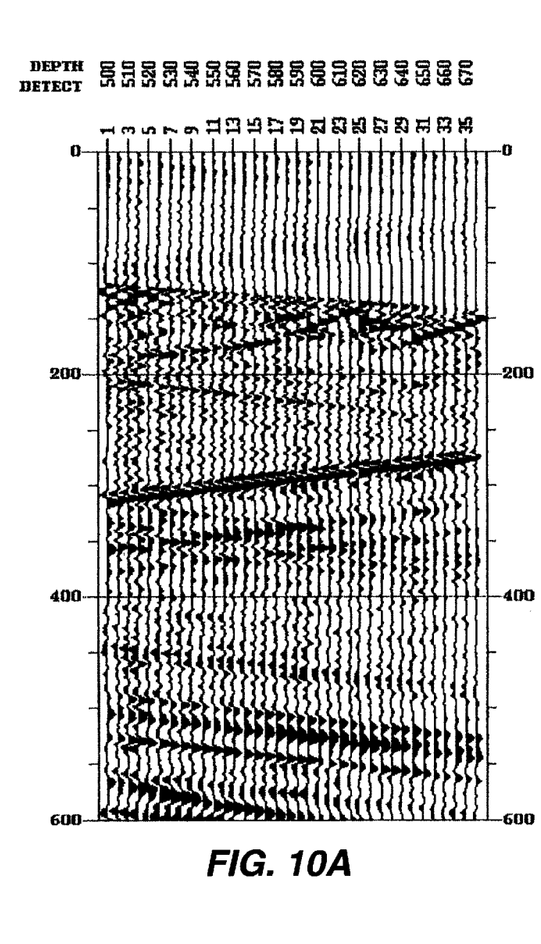
FIGS. 10(a) and 10(b) show offset checkshot survey shot gathers from the field test illustrated in FIG. 9 before (a) and after (b) applying F-K Filter.
Figure 10B:
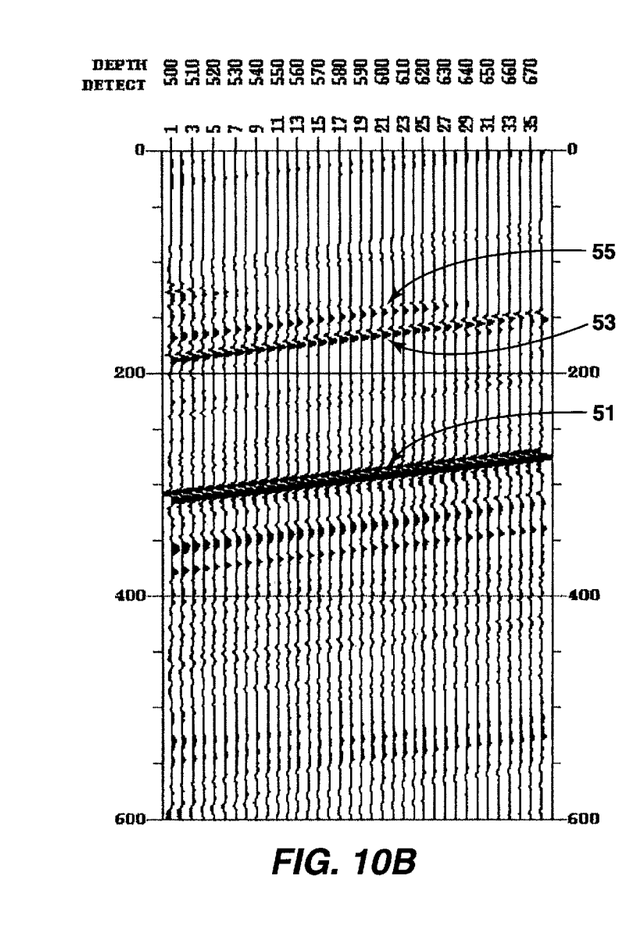

FIGS. 9, 10(a), and 10(b) illustrate a field test of the embodiment of the invention shown in FIG. 6. The field test is illustrated schematically in FIG. 9. In the field test, a 36-channel hydrophone streamer 35 was used as the acoustic receiver and a sink weight 37, a digitizer 39, and the bottom of the borehole 22 were used as tube-wave conversion points. The shot gathers, before and after applying F-K filter, are displayed in FIGS. 10(a) and 10(b) respectively. The F-K filter effectively removed the downgoing waves and enhanced the upgoing tube waves. From FIG. 10(b), one can clearly identify three upgoing tube waves that are created by the conversion at the bottom of the hole 51, the sink weight at the end of the streamer 53 and a digitizer in the streamer 55. Thus, it is clear that constrictions attached to a cable suspended in the borehole can be used to create additional tube-wave conversion points.

The present invention substantially reduces the cost of acquiring offset checkshot survey data. The shallow receiver system is much simpler to operate and less expensive than a regular downhole receiver tool operated in the deep portion of a well because the shallow receivers do not have to withstand the high temperatures and hydrostatic pressures that exist deep in a well. No downhole digitizer is needed. Analog signals can be transmitted up-hole through a multi-conductor cable and recorded with a small (portable) recording system on the surface. Moreover, the low cost of the hardware used for the present invention makes permanent deployment of the system economically justifiable. Such permanent deployment would allow for further cost reduction, for example by allowing simultaneous acquisition of offset checkshot survey data and surface seismic data using one surface source.

The system of the present invention is easy to deploy since it is only deployed near the top of the well. The system can also be deployed in the annulus between casing and production tubing so that the acquisition of offset checkshot survey data will not interfere with other wellbore operations, such as logging and production. This implementation eliminates the need to remove production tubing from a production well.

The present invention produces offset checkshot survey data simultaneously at several depths in the well (wherever there is a significant discontinuity in the well geometry, constrictions in the borehole, or a strong lithological impedance contrast). This permits the survey to be completed in a short period of time without the need for repositioning the receiver in the wellbore. Moreover, one can predetermine the conversion points to obtain favorable coverage for offset checkshot survey traveltimes. Knowing the conversions points precisely provides more accurate determination of the offset checkshot survey traveltimes.

An alternate embodiment of the invention utilizes tube-wave conversion in the reverse direction. This could be done using the tube-wave converter described above and in U.S. Pat. No. 4,993,001. The converter would be lowered into the well on a wireline and positioned at the desired depth. An array of seismic detectors (e.g., geophones) would be placed on the surface of the earth at the desired positions. A tube wave would then be generated at the surface and injected into the well. The tube wave would be guided downwardly by the fluid-filled borehole until it reached the tube-wave converter where it would be converted into a body wave radiating outwardly into the surrounding formations. The body wave would be detected by the surface detector array. Using reciprocity, the offset checkshot survey traveltime data would be the total traveltime minus the tube wave traveltime from the surface to the conversion point. The tube wave converter would then be repositioned in the well to the next desired location.

The foregoing description has been directed to particular embodiments of the invention for the purpose of illustrating the invention. It will be apparent to persons skilled in the art, however, that many alternatives, modifications, and variations to the embodiments described herein are possible. All such alternatives, modifications, and variations are intended to be within the scope of the present invention, as defined by the appended claims.

What is claimed is:

1. A method for acquiring offset checkshot survey data for the subsurface region in the vicinity of a fluid-filled well, said method comprising the steps of:

deploying an acoustic receiver at a known depth in said well;

determining the tube-wave traveltime from said acoustic receiver to a tube-wave conversion point located in said well;

generating a seismic signal at a source location that is laterally offset from said well;

measuring the total traveltime of said seismic signal along a raypath from said source location to said tube-wave conversion point and then through said fluid to said acoustic receiver; and subtracting said tube-wave traveltime from said total traveltime to determine the seismic signal traveltime from said source location.

2. The method of claim 1, wherein said acoustic receiver is deployed near the upper end of said well and said tube-wave conversion point is located below said acoustic receiver and wherein said tube-wave traveltime from said acoustic receiver to said tube-wave conversion point is determined by:

generating a downgoing tube wave at a location in said well above said acoustic receiver;

measuring the two-way traveltime of said downgoing tube wave from said acoustic receiver downwardly to said tube-wave conversion point and then upwardly back to said acoustic receiver; and dividing said two-way traveltime by two.

3. The method of claim 1, wherein said source location is in an offset well.

4. The method of claim 1, wherein said source location is at or near the surface of the earth.

5. The method of claim 1, wherein said acoustic receiver is a hydrophone.

6. The method of claim 1, wherein said acoustic receiver is a geophone.

7. The method of claim 1, wherein the upper portion of said well has at least an outer surface casing and an inner production casing, and wherein said acoustic receiver is deployed in the annulus between said outer surface casing and said inner production casing.

8. A method for determining the traveltime of a seismic signal from a laterally-offset source location to a downhole location in a fluid-filled well, said method comprising the steps of:

creating a tube-wave conversion point at said downhole location;

deploying an acoustic receiver at a known depth in said well;

determining the tube-wave traveltime from said acoustic receiver to said tube-wave conversion point;

generating a seismic signal at said source location;

measuring the total traveltime of said seismic signal from said source location to said tube-wave conversion point and then through said fluid to said acoustic receiver; and subtracting said tube-wave traveltime from said total traveltime to determine the seismic signal traveltime from said source location to said downhole location.

9. The method of claim 8, wherein said tube-wave conversion point is created by attaching a constriction to the well tubulars at said downhole location.

10. The method of claim 8, wherein said tube-wave conversion point is created by attaching a constriction to a cable and hanging said cable in said well such that said constriction is positioned at said downhole location.

11. The method of claim 8, wherein said tube-wave conversion point is created by positioning the interface between two immiscible fluids at said downhole location.

12. The method of claim 8, wherein said acoustic receiver is deployed near the upper end of said well and said tube-wave conversion point is located below said acoustic receiver and wherein said tube-wave traveltime from said acoustic receiver to said tube-wave conversion point is determined by generating a downgoing tube wave at a location in said well above said acoustic receiver;

measuring the two-way traveltime of said downgoing tube wave from said acoustic receiver downwardly to said tube-wave conversion point and then upwardly back to said acoustic receiver; and dividing said two-way traveltime by two.

13. The method of claim 8, wherein said source location is in an offset well.

14. The method of claim 8, wherein said source location is at or near the surface of the earth.

15. The method of claim 8, wherein said acoustic receiver is a hydrophone.

16. The method of claim 8, wherein said acoustic receiver is a geophone.

17. The method of claim 8, wherein the upper portion of said well has at least an outer surface casing and an inner production casing, and wherein said acoustic receiver is deployed in the annulus between said outer surface casing and said inner production casing.

18. The method of claim 10, wherein the depths of said tube-wave conversion points are pre-determined to obtain favorable coverage of said seismic signal.

19. Apparatus for acquiring offset checkshot survey data for the subsurface region in the vicinity of a fluid-filled well, said apparatus comprising:

a seismic source for generating body waves in said subsurface region;

at least one tube-wave conversion point located in said well for converting body waves to tube waves;

at least one acoustic receiver located in said well for receiving converted tube waves;

means for measuring the tube-wave traveltime from said tube-wave conversion point to said acoustic receiver; and means for measuring the total traveltime of a seismic signal from said seismic source to said tube-wave conversion point and then through said fluid-filled well to said acoustic receiver.

20. The apparatus of claim 19, said apparatus further comprising means for dampening tube waves generated above said acoustic receiver.

21. The apparatus of claim 19, wherein the upper portion of said well has at least an outer surface casing and an inner production casing, and wherein said acoustic receiver is deployed in the annulus between said outer surface casing and said inner production casing.

22. The apparatus of claim 19, wherein said at least one acoustic receiver is a hydrophone.

23. The apparatus of claim 19, wherein said at least one acoustic receiver is a geophone.

24. The apparatus of claim 19, said apparatus further comprising a tube-wave source located at or near the top of said well.

25. The apparatus of claim 19, wherein said at least one acoustic receiver comprises a plurality of hydrophones arranged in a linear array.

* * * * *

UNITED STATES PATENT AND TRADEMARK OFFICE
CERTIFICATE OF CORRECTION

PATENT NO.     : 6,591,193 B2  
DATED          : July 8, 2003  
INVENTOR(S)    : Jerome R. Krebs and Sen-Tsuen Chen

It is certified that error appears in the above-identified patent and that said Letters Patent is hereby corrected as shown below:

Column 7,
Line 57, should read as follows:

$V = (T_n - T_m) \div X$  should read  $V = X \div (T_n - T_m)$

Signed and Sealed this

Seventh Day of October, 2003

JAMES E. ROGAN
*Director of the United States Patent and Trademark Office*